United States Patent
Meng et al.

(10) Patent No.: US 12,272,808 B2
(45) Date of Patent: Apr. 8, 2025

(54) TEMPERATURE CONTROL APPARATUS AND TEMPERATURE CONTROL SYSTEM

(71) Applicant: Huawei Digital Power Technologies Co., Ltd., Shenzhen (CN)

(72) Inventors: Hao Meng, Dongguan (CN); Quanming Li, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 540 days.

(21) Appl. No.: 17/729,168

(22) Filed: Apr. 26, 2022

(65) Prior Publication Data

US 2022/0359932 A1 Nov. 10, 2022

(30) Foreign Application Priority Data

May 6, 2021 (CN) .......................... 202110491571.X

(51) Int. Cl.
*H01M 10/6567* (2014.01)
*H01M 10/613* (2014.01)
*H01M 10/627* (2014.01)
*H01M 10/63* (2014.01)

(52) U.S. Cl.
CPC ..... *H01M 10/6567* (2015.04); *H01M 10/613* (2015.04); *H01M 10/627* (2015.04); *H01M 10/63* (2015.04); *H01M 2220/10* (2013.01)

(58) Field of Classification Search
CPC ........... H01M 10/6567; H01M 10/613; H01M 10/627; H01M 10/63; H01M 2220/10; H01M 2200/00; H01M 10/615; Y02E 60/10

See application file for complete search history.

(56) References Cited

U.S. PATENT DOCUMENTS

| | | | |
|---|---|---|---|
| 6,182,742 B1 | 2/2001 | Takahashi et al. | |
| 2016/0248129 A1 | 8/2016 | Dunham et al. | |
| 2020/0298663 A1* | 9/2020 | Allgaeuer | B60H 1/00885 |
| 2020/0303791 A1 | 9/2020 | Choi et al. | |
| 2021/0138867 A1* | 5/2021 | Kim | B60H 3/024 |

(Continued)

FOREIGN PATENT DOCUMENTS

| | | | | |
|---|---|---|---|---|
| CN | 106585414 A | * | 4/2017 | ......... B60H 1/00271 |
| CN | 107768774 A | | 3/2018 | |

(Continued)

*Primary Examiner* — Kaity V Chandler
(74) *Attorney, Agent, or Firm* — Maier & Maier, PLLC

(57) ABSTRACT

A temperature control apparatus and a temperature control system include at least one liquid storage device for storing liquid, at least two liquid supply devices, and a controller. Each liquid supply device is connected to the at least one liquid storage device through a first multiport valve to obtain liquid and is connected to a temperature regulating device through a second multiport valve. The controller is configured to control the first multiport valve and the second multiport valve that are connected to the controller to be conducted or not to be conducted. When the first multiport valve and the second multiport valve are conducted, each liquid supply device outputs the obtained liquid to the temperature regulating device. The temperature regulating device regulates a temperature of the liquid injected by each liquid storage device, and then supplies the liquid to at least one battery system.

19 Claims, 11 Drawing Sheets

(56) References Cited

U.S. PATENT DOCUMENTS

2021/0138868 A1* 5/2021 Bruneau .............. H01M 10/615
2021/0387547 A1* 12/2021 Yang .................. B60H 1/00278

FOREIGN PATENT DOCUMENTS

| | | | | |
|---|---|---|---|---|
| CN | 207677039 U | | 7/2018 | |
| CN | 209001072 U | | 6/2019 | |
| CN | 110034354 A | | 7/2019 | |
| CN | 209181344 U | | 7/2019 | |
| CN | 110233309 A | | 9/2019 | |
| CN | 209843909 U | * | 12/2019 | ............ Y02E 60/10 |
| CN | 110816208 A | | 2/2020 | |
| CN | 111319514 A | * | 6/2020 | ......... B60H 1/00278 |
| CN | 111347939 A | | 6/2020 | |
| CN | 111354998 A | | 6/2020 | |
| CN | 111376692 A | | 7/2020 | |
| CN | 112428766 A | | 3/2021 | |
| JP | 2007257976 A | | 10/2007 | |
| KR | 20220021201 A | * | 2/2022 | ........... H01M 10/615 |
| WO | 2018131154 A1 | | 7/2018 | |
| WO | 2019184193 A1 | | 10/2019 | |

\* cited by examiner

TEMPERATURE CONTROL APPARATUS AND TEMPERATURE CONTROL SYSTEM

CROSS-REFERENCE TO RELATED APPLICATION

This application claims priority to Chinese patent application Ser. No. 202110491571.X, filed on May 6, 2021, which is hereby incorporated by reference in its entirety.

TECHNICAL FIELD

The embodiments relate to the field of battery energy storage, and in particular, to a temperature control apparatus and a temperature control system.

BACKGROUND

With a rapid decrease of costs of batteries and advantages such as flexible application and high controllability of battery energy storage, the batteries have been rapidly developed as a power generation side or a power consumption side. Especially in the field of existing electric vehicles, a demand for chemical batteries represented by lithium batteries is increasing. Therefore, battery energy storage products occupy a large proportion in full energy storage.

A life span of a battery energy storage product in an existing market is directly related to an ambient temperature at which batteries are stored, and an indispensable temperature control system in an energy storage product directly affects performance of a battery product. However, conventional forced air cooling cannot meet product application requirements, and a commonly used temperature control method in the conventional technology still has many disadvantages. Therefore, a new temperature control method needs to be urgently provided, to regulate a storage temperature of a battery system.

SUMMARY

A temperature control apparatus and a temperature control system are provided for reliably and stably regulating a temperature of a battery system.

According to a first aspect, an embodiment provides a temperature control apparatus, including a liquid dispensing device and a temperature regulating device. The liquid dispensing device includes at least one liquid storage device, at least two liquid supply devices, and a controller. The at least one liquid storage device is configured to store liquid. An input of each liquid supply device is connected to the at least one liquid storage device through a first multiport valve to obtain cooling liquid, and an output of each liquid supply device is connected to the temperature regulating device through a second multiport valve. The controller is connected to the first multiport valve and the second multiport valve and is configured to control the first multiport valve and the second multiport valve to be conducted or not to be conducted. Each liquid supply device is configured to output the cooling liquid from the at least one liquid storage device to the temperature regulating device when the corresponding first multiport valve and the corresponding second multiport valve are both conducted. The temperature regulating device is configured to connect an output of the second multiport valve, regulate a temperature of liquid injected by each liquid storage device, and supply the temperature-regulated liquid to at least one battery system.

According to an implementation, each liquid dispensing device includes the at least one liquid storage device that can be used to store liquid, the at least two liquid supply devices, and the controller. The input of each liquid supply device may be connected to the at least one liquid storage device through the first multiport valve to obtain the cooling liquid, and the output of each liquid supply device may be connected to the temperature regulating device through the second multiport valve. The controller may be connected to the first multiport valve and the second multiport valve to control whether the first multiport valve and the second multiport valve are conducted. Each liquid supply device may be configured to output the cooling liquid from the at least one liquid storage device to the temperature regulating device when the corresponding first multiport valve and the corresponding second multiport valve are both conducted, so that the temperature regulating device may regulate the temperature of the liquid injected by each liquid storage device and supply the temperature-regulated liquid to the at least one battery system. Therefore, the temperature control apparatus can supply the temperature-regulated liquid to each battery system through each liquid supply device, and when one of the at least two liquid supply devices is faulty, the controller may further control another liquid supply device that normally operates to continue to supply liquid to the temperature regulating device. Therefore, a temperature control process of the battery system is more reliable and effective.

In one possible implementation, when two adjacent liquid supply devices normally operate, the controller controls a first single valve and a second single valve, that are in the second multiport valve, to be conducted, and controls a third single valve in the second multiport valve not to be conducted, so that liquid output by each liquid supply device is separately injected into a corresponding battery system through the temperature regulating device. The first single valve is configured to connect an output of one of the two adjacent liquid supply devices to the temperature regulating device, the second single valve is configured to connect an output of the other one of the two adjacent liquid supply devices to the temperature regulating device, and the third single valve is configured to connect the outputs of the two adjacent liquid supply devices.

According to an implementation, when the two adjacent liquid supply devices normally operate, the controller can control the first single valve and the second single valve, that are in the second multiport valve, to be conducted, and control the third single valve in the second multiport valve not to be conducted. The first single valve is connected to the output of one of the liquid supply devices and the temperature regulating device, the second single valve is connected to the output of the other liquid supply device and the temperature regulating device, and the third single valve is connected to the outputs of the two adjacent liquid supply devices. Therefore, the operation may enable each liquid supply device to separately inject the liquid into the corresponding battery system through the temperature regulating device.

In one possible implementation, when either of two adjacent liquid supply devices is faulty, the controller controls a first single valve and a second single valve, that are in the second multiport valve, to be conducted, and controls a third single valve in the second multiport valve to be conducted, so that liquid output by the liquid supply device that normally operates is injected into a corresponding battery system through the temperature regulating device, and injected into a battery system corresponding to the faulty liquid supply device through the temperature regulating device. The first single valve is configured to connect an output of one of the two adjacent liquid supply devices to the temperature regulating device, the second single valve is configured to connect an output of the other one of the two adjacent liquid supply devices to the temperature regulating device, and the third single valve is configured to connect the outputs of the two adjacent liquid supply devices.

According to an implementation, when either of the two adjacent liquid supply devices is faulty, the controller may control the third single valve in the second multiport valve to be conducted, because the third single valve is configured to connect the outputs of the two adjacent liquid supply devices. Therefore, the operation can enable the liquid output by the liquid supply device that normally operates to be injected into the corresponding battery system through the temperature regulating device, and the liquid can also be supplied to the battery system corresponding to the faulty liquid supply device through the temperature regulating device. Therefore, it can be ensured that each battery system can store liquid at a temperature to maintain normal operation.

In a possible implementation, the controller may be further configured to: when the two adjacent liquid supply devices normally operate, control the first single valve and the second single valve, that are in the second multiport valve, to be conducted, and receive a first instruction before controlling the third single valve in the second multiport valve not to be conducted, where the first instruction is used to instruct the controller to control the first single valve and the second single valve, that are in the second multiport valve connected to the controller, to be conducted and control the third single valve in the second multiport valve connected to the controller not to be conducted.

According to an implementation, the controller can control, according to an instruction, the third single valve, that is in the second multiport valve and that is connected to the outputs of the two adjacent liquid supply devices, to be conducted. It can be ensured that the controller receives a corresponding instruction and performs a corresponding operation in a situation, so that no disorder is caused.

In a possible implementation, the controller is further configured to: when either of the two adjacent liquid supply devices is faulty, control the first single valve and the second single valve, that are in the second multiport valve, to be conducted, and receive a second instruction before controlling the third single valve in the second multiport valve to be conducted, where the second instruction is used to instruct the controller to control the first single valve, the second single valve, and the third single valve, that are in the second multiport valve connected to the controller, to be conducted.

According to an implementation, the controller can control, according to an instruction, the third single valve, that is in the second multiport valve and that is connected to the outputs of the two adjacent liquid supply devices, to be conducted. It can be ensured that the controller receives a corresponding instruction and performs a corresponding operation in a situation, so that no disorder is caused.

In one possible implementation, when the at least one liquid storage device normally operates, the controller controls the first multiport valve to be conducted, so that the at least one liquid storage device separately injects liquid into the at least two liquid supply devices. According to the implementation, when the at least one liquid storage device normally operates, the controller controls the first multiport valve to be conducted. The operation enables each liquid storage device to supply liquid to the at least two liquid supply devices.

In one possible implementation, when any one of the at least one liquid storage device is faulty, a single valve in the first multiport valve and that corresponds to a liquid storage device that normally operates is controlled to be conducted, so that the liquid storage device that normally operates separately injects liquid into the at least two liquid supply devices.

According to an implementation, when any one of the at least one liquid storage device is faulty, the controller can control the single valve that is in the first multiport valve and that corresponds to the output of the liquid storage device that normally operates to be conducted. The operation can ensure that the liquid storage device that normally operates injects liquid into the at least two liquid supply devices, and further ensure that each battery system can store liquid at a temperature. It should be understood that, because the faulty liquid storage device cannot output liquid, a single valve that is in the first multiport valve and that corresponds to an output of the faulty liquid storage device may or may not be conducted. This is not limited.

In a possible implementation, the controller is further configured to: when the at least one liquid storage device normally operates, receive a third instruction before controlling the first multiport valve to be conducted, where the third instruction is used to instruct the controller to control the first multiport valve to be conducted. According to the implementation, the controller can control, according to the instruction, the first multiport valve to be conducted, to ensure that the controller receives a corresponding instruction and performs a corresponding operation in a situation, so that no disorder is caused.

In a possible implementation, the controller is further configured to: when any one of the at least one liquid storage device is faulty, receive a fourth instruction before controlling a single valve that is in the first multiport valve and that corresponds an output of a liquid storage device that normally operates to be conducted, where the fourth instruction is used to instruct the controller to control the single valve that is in the first multiport valve and that corresponds to the liquid storage device that normally operates to be conducted. According to the implementation, the controller can control, according to the instruction, the single valve that is in the first multiport valve and that corresponds to the liquid storage device that normally operates to be conducted, to ensure that the controller receives a corresponding instruction and performs a corresponding operation in a situation, so that no disorder is caused.

In a possible implementation, the liquid dispensing device further includes a liquid discharge port and a liquid discharge valve. The liquid discharge valve is configured to connect the output of the at least one liquid storage device. The controller is further connected to the liquid discharge valve. The controller is further configured to: when the liquid in the liquid storage device needs to be replaced, control the first multiport valve connected to the liquid supply device not to be conducted, and control the liquid discharge valve to be conducted, so that remaining liquid in the liquid storage device is discharged through the liquid discharge port.

According to the implementation, when the liquid stored in the liquid storage device needs to be replaced or the liquid dispensing device is in a maintenance state, for example, when a vulnerable component needs to be replaced, the controller can control the first multiport valve connected to the liquid supply device not to be conducted, and control the liquid discharge valve to be conducted, so that the liquid storage device no longer injects liquid into the liquid supply device, but discharge the liquid through the liquid discharge port. It should be understood that the liquid discharge valve may alternatively be manually conducted or not to be conducted.

In a possible implementation, the at least one liquid storage device may be further configured to be connected to the at least one battery system, and the at least one liquid storage device is further configured to store liquid discharged by the at least one battery system when the at least one battery system is used. According to the implementation, the at least one liquid storage device may further store the liquid discharged by the at least one battery system when the at least one battery system is used, so that the liquid can be recycled, and resource waste is avoided.

According to a second aspect, an embodiment further provides a temperature control system. The temperature control system includes the temperature control apparatus provided in the first aspect and at least one battery system. The temperature control apparatus is configured to inject liquid into the at least one battery system, to ensure that temperature-regulated liquid can be injected into each battery system, to implement temperature regulation for the at least one battery system.

For effects that can be achieved in the second aspect, refer to descriptions of effects that can be achieved by any implementation in the first aspect or the first aspect. Details are not described herein again.

DETAILED DESCRIPTION OF THE EMBODIMENTS

Figure 1:
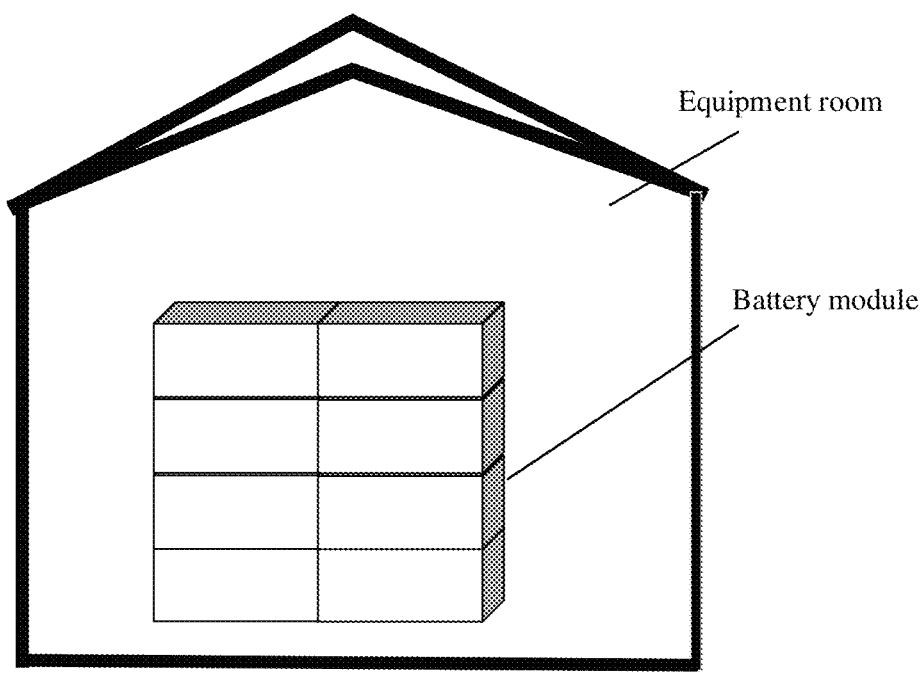
FIG. 1 is a possible applicable application scenario of a temperature control apparatus according to an embodiment.

Embodiments provide a temperature control apparatus and system. The apparatus and the system are based on a same or similar concept. Because problem solving principles of the apparatus and the system are similar, reference may be made to each other for implementation of the apparatus and the method. Repeated descriptions are not described again.

The following describes some terms in embodiments, to help a person skilled in the art have a better understanding.

(1) A battery system in the embodiments is used to supply electric energy. For example, in a storage field, an electric vehicle field, or a communications field, the battery system is used for charging.

It should be noted that, in the embodiments, each battery system may include a single battery or a plurality of battery devices, and each battery system further includes a device configured to store liquid. A structure of the device for storing the liquid may be disposed around the single battery or the plurality of battery devices, so that the single battery or the plurality of battery devices as a whole can evenly obtain the liquid.

In addition, a battery type in the battery system in the embodiments includes but is not limited to a lithium battery, a dry battery, a lead battery, a fuel cell, and the like.

(2) Liquid in the embodiments may include but is not limited to water or may be liquid whose temperature can be changed in a heating or cooling manner, for example, may be oil.

In addition, in actual use, the temperature control apparatus may not be limited to liquid in which a phase change occurs and may further be gas or another medium in which a temperature change can occur. This is not limited.

(3) A liquid supply device in the embodiments uses mechanical energy of a prime mover or other external energy to perform liquid injection, to increase liquid energy, and is used to transport liquid. For example, the liquid supply device may be a water pump, and a liquid supply device is not limited.

(4) A liquid storage device in the embodiments is configured to store liquid. The liquid storage device may be a container of a specified volume, for example, may be a liquid tank or a liquid box. A structure and a form of the liquid storage device are not limited.

(5) In the embodiments, "a plurality of" indicates greater than or equal to two.

It should be noted that, in the description of the embodiments, "and/or" describes an association relationship between associated objects, and it indicates that three relationships may exist. For example, A and/or B may indicate that only A exists, both A and B exist, and only B exists. "Connection" describes a connection relationship between two objects and may indicate two connection relationships. For example, A is directly connected to B, and A is connected to B through C.

The character "/" usually indicates an "or" relationship between the associated objects. In the embodiments, "at least one" means one or more, and "a plurality of" means two or more.

In addition, it should be understood that, in the descriptions, the terms such as "first", "second", and "third" are merely used for differentiation and description but cannot be understood as an indication or implication of relative importance or an indication or implication of an order.

Reference to "one implementation", "some implementations", or the like means that one or more implementations include a particular feature, structure, or characteristic described with reference to the embodiment. Thus, the terms "include", "contain", "have" and variations thereof mean "including but not limited to", unless otherwise specifically emphasized.

The following describes in detail embodiments with reference to accompanying drawings.

FIG. 1 shows an example of an application scenario of a temperature control system. As shown in FIG. 1, a power supply equipment room includes a plurality of battery devices. The battery device may be configured to supply power to a communications device connected to the battery device. When a to-be-powered communications device normally operates, a temperature of a battery system of the communications device is accordingly increased. Alternatively, when an environment temperature of the power supply equipment room is low, a temperature of the battery device in the equipment room is also reduced. This causes a decrease in power supply capabilities of the plurality of battery devices in the equipment room, and the connected communications device cannot be normally supplied with power. In addition, a life span of the battery device in the power supply equipment room is accordingly affected. Therefore, it is urgent to regulate the temperature of the battery device by using a temperature control manner, so that the temperature of the battery device can be continuously within a normal operating range.

In a conventional temperature control system, forced air cooling cannot meet a requirement of battery temperature control. Therefore, in an existing temperature control system, a liquid cooling unit is used to supply water to the battery device, and a battery temperature is controlled by controlling a temperature of the water. However, in this manner, once the liquid cooling unit is faulty, the battery temperature cannot be continuously controlled, and therefore, there are problems such as low reliability and difficult maintenance.

Therefore, a temperature control apparatus may improve stability of temperature control of a battery system and reduce maintenance difficulty.

Figure 2A:
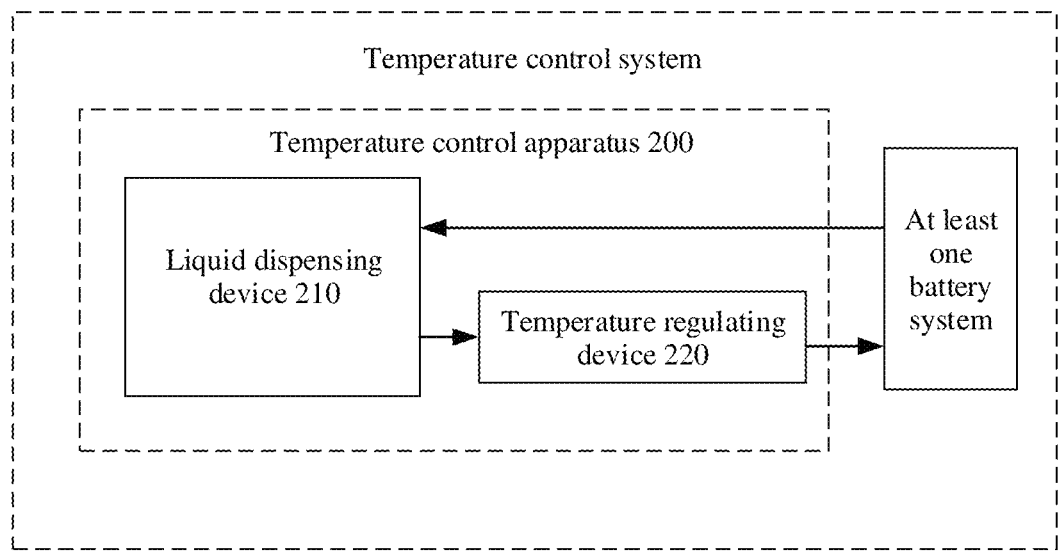
FIG. 2A is a schematic diagram of a structure of a temperature control apparatus according to an embodiment.

The temperature control apparatus provided in this embodiment may be applied to a temperature control system. As shown in FIG. 2A, the temperature control system includes a temperature control apparatus 200 and at least one battery system. The temperature control apparatus 200 is configured to inject liquid into the at least one battery system. The temperature control apparatus 200 may regulate a temperature of the at least one battery system by controlling and regulating a temperature of the injected liquid.

Each battery system may include a single battery or a plurality of battery devices. The single battery or the plurality of battery devices may be configured to charge or provide electric energy to a connected electronic device or apparatus. The single battery or the plurality of battery devices in the battery system may be disposed around the temperature control apparatus 200, so that the single battery or the plurality of battery devices as a whole can evenly obtain the liquid supplied by the temperature control apparatus 200.

The temperature control apparatus 200 may include a liquid dispensing device 210 and a temperature regulating device 220. The operating principles of the liquid dispensing device 210 and the temperature regulating device 220 are described in detail below with reference to the accompanying drawings.

Figure 2B:
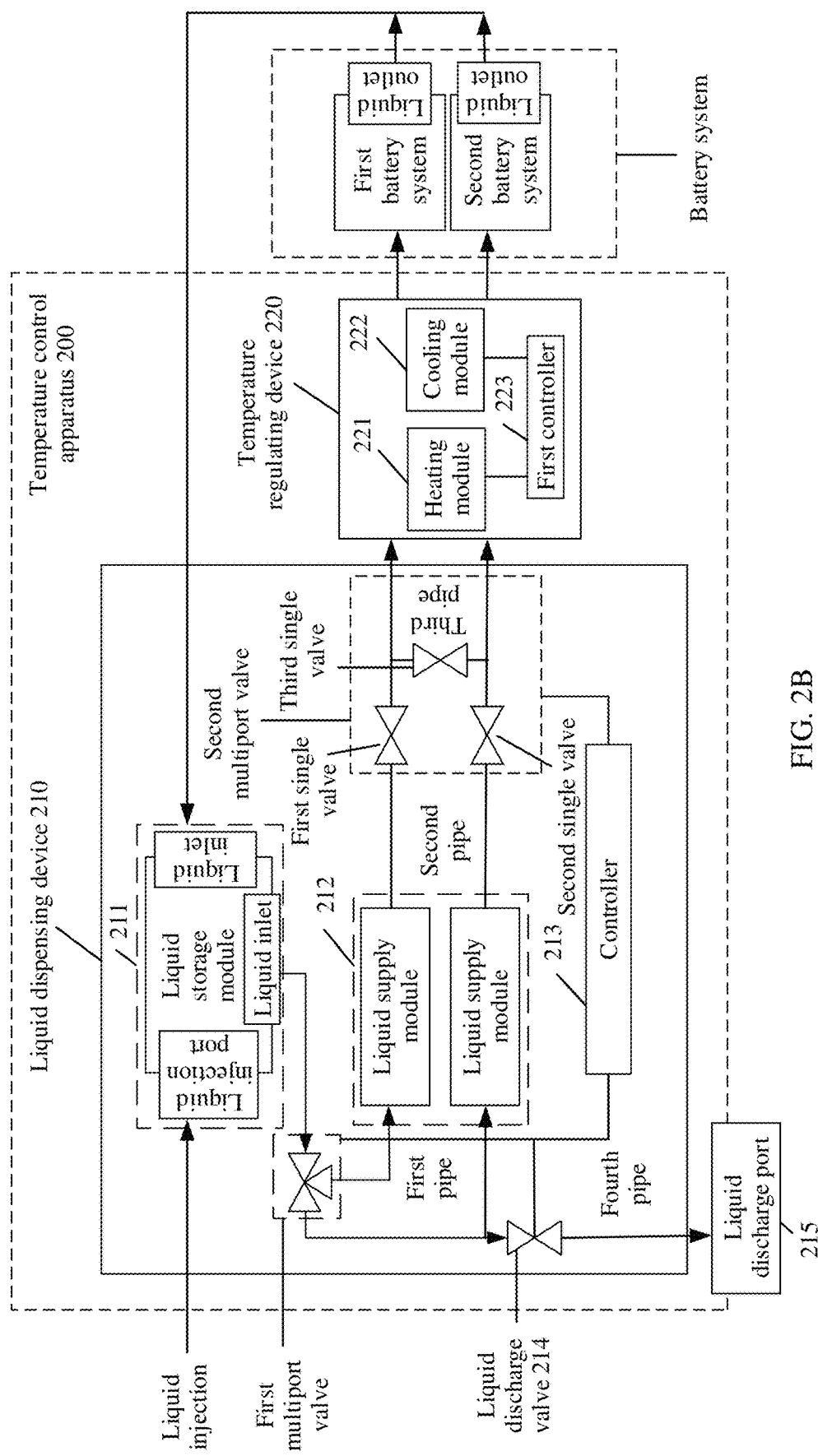
FIG. 2B is a schematic diagram of a structure of a temperature control apparatus according to an embodiment.

FIG. 2B is a schematic diagram of an architecture of the temperature control apparatus. The temperature control apparatus 200 is configured to connect to at least one battery system and is configured to effectively supply temperature-regulated liquid to the at least one battery system, to regulate a temperature of the battery system by using the temperature-regulated liquid and ensure that the battery system effectively supplies power to a connected electronic device or apparatus.

The liquid dispensing device 210 may include at least one liquid storage device 211, at least two liquid supply devices 212, and a controller 213. An input of each liquid supply device 212 is connected to the at least one liquid storage device 211 through a first multiport valve to obtain cooling liquid, and an output of each liquid supply device 212 is connected to the temperature regulating device 220 through a second multiport valve. The controller 213 is connected to the first multiport valve and the second multiport valve. The temperature regulating device 220 is configured to connect to an output of the second multiport valve, regulate a temperature of liquid injected by each liquid storage device 211, and supply the temperature-regulated liquid to the at least one battery system.

The at least one liquid storage device 211 is configured to store liquid. The liquid may be any liquid having a temperature control regulating capability, such as water or oil.

At least one liquid injection port may be disposed in each liquid storage device 211, and an external device may separately inject liquid into each liquid storage device 211 through the at least one liquid injection port. In addition, the at least one liquid storage device 211 may be further connected to the at least one battery system through one liquid inlet, and may be connected to the battery system through connection to a liquid outlet of the battery system, so that each battery system can discharge used liquid from a liquid discharge port of each battery system to at least one liquid storage device 211 through the liquid outlet and the liquid inlet of the liquid storage device. There may also be a plurality of battery systems. In FIG. 2B, for example, a first battery system and a second battery system are included. It should be understood that different battery systems may be connected to different liquid storage devices 211, or different battery systems may be separately connected to a same liquid storage device 211. This is not limited herein.

According to the implementation, the at least one liquid storage device 211 can inject the liquid through the external device, or recycle liquid used in the battery system, to avoid liquid resource waste.

Each liquid storage device 212 is configured to: when the corresponding first multiport valve and the corresponding second multiport valve are both conducted, output the cooling liquid from the at least one liquid storage device 211 to the temperature regulating device 220. A single valve that is of the first multiport valve and that corresponds to the input of each liquid supply device 211 and a single valve that is in the second multiport valve and that corresponds to the output of each liquid supply device 212 are further configured to prevent liquid backflow during conduction. In this way, it can be ensured that a liquid backflow phenomenon does not occur when the liquid storage device 211 injects the liquid to the liquid supply device 212, and that the liquid backflow phenomenon does not occur when the liquid supply device 212 injects the liquid to a corresponding battery system. In FIG. 2B, two liquid supply devices 212 are used for illustration. Further, more liquid supply devices 212 may be included according to implementations.

The controller 213 may be configured to control, according to a received instruction, the first multiport valve and the second multiport valve to be conducted or not to be conducted. When the controller 213 controls, according to the received instruction, the first multiport valve to be conducted or not to be conducted, the following operating cases may be included:

It should be understood that the first multiport valve includes a plurality of single valves, each single valve is correspondingly connected to an output of one liquid storage device 211 and an input of one liquid supply device 212.

Case 1: When the controller 213 controls, according to the received instruction, single valves, that are in the first multiport valve and that are correspondingly connected to the at least two liquid supply devices 212, to be conducted, the at least one liquid storage device 211 may inject liquid into the at least two liquid supply devices 212.

Case 2: When the controller 213 controls, according to the received instruction, single valves, that are in the first multiport valve and that respectively corresponds to the at least two liquid supply devices 212, not to be conducted, the at least one liquid storage device 211 cannot inject liquid into the at least two liquid supply devices 212.

Case 3: When the controller 213 controls, according to the received instruction, a single valve, corresponding to an input of any one of the at least two liquid supply devices 212, not to be conducted, and a single valve corresponding to an input of another liquid supply device 212 is conducted, the at least one liquid storage device 211 cannot inject liquid into the liquid supply device 212 corresponding to the single valve that is not conducted, but can inject liquid into the liquid supply device 212 corresponding to the another single valve that is conducted.

Single valves that are in the first multiport valve and are correspondingly connected to the inputs of the at least two liquid supply devices 212 may be in a normally-conducted state, so that the at least one liquid storage device 211 may continuously inject liquid to the at least two liquid supply devices 212 through the first multiport valve.

By conducting or not conducting single valves in that are the first multiport valve separately corresponding to the at least two liquid supply devices 212, the at least one liquid storage device 211 may be flexibly controlled to inject liquid into a part or all of the at least two liquid supply devices 212.

When the controller 213 controls, according to the received instruction, the second multiport valves, correspondingly connected to the at least two liquid supply devices 212, to be conducted or not to be conducted, the following cases may be included:

Case 1: When the two adjacent liquid supply devices 212 normally operate, the controller 213 receives a first instruction, and may control, according to the first instruction, a first single valve and a second single valve, that are in the second multiport valve, to be conducted, and control a third single valve in the second multiport valve not to be conducted. The first single valve is configured to connect an output of one of the two adjacent liquid supply devices 212 to the temperature regulating device 220, the second single valve is configured to connect an output of the other one of the two adjacent liquid supply devices 212 to the temperature regulating device 220, and the third single valve is configured to connect the outputs of the two adjacent liquid supply devices 212. Therefore, the operation enables each liquid supply device 212 that normally operates to separately inject liquid into a corresponding battery system through the temperature regulating device 220 without affecting each other.

Case 2: When either of the two adjacent liquid supply devices is faulty, the controller receives a second instruction, and may control, according to the second instruction, a first single valve and a second single valve, that are in the second multiport valve to be conducted and control a third single valve in the second multiport valve to be conducted. The first single valve is configured to connect an output of one of the two adjacent liquid supply devices 212 to the temperature regulating device 220, the second single valve is configured to connect an output of the other one of the two adjacent liquid supply devices 212 to the temperature regulating device 220, and the third single valve is configured to connect the outputs of the two adjacent liquid supply devices 212. Therefore, the operation enables the liquid supply device 212 that normally operates to inject liquid into a corresponding battery system through the temperature regulating device 220 and may also inject liquid into a battery system corresponding to the faulty liquid supply device through the temperature regulating device 220.

Therefore, in the liquid dispensing device 210, if the two adjacent liquid supply devices 212 normally operate, the controller 213 may control, according to the received instruction, the third single valve in the second multiport valve not to be conducted, so that each liquid supply device 212 may separately inject liquid into the corresponding battery system. If either of the two adjacent liquid supply devices 212 is faulty, the controller 213 may control, according to the received instruction, the third single valve in the second multiport valve to be conducted, so that a liquid supply device 212 that normally operates can inject liquid into a corresponding battery system, or may inject liquid into a battery system corresponding to the faulty liquid supply device 212 at the same time, to ensure that each battery system can obtain liquid at a temperature, thereby maintaining stable and normal operation of the battery system.

It should be understood that, in actual use, each liquid supply device 212 may be connected to the at least one liquid storage device 211 through corresponding at least one first pipe, and each pipe is controlled by a single valve in the first multiport valve. Therefore, when the single valve in the first multiport valve is conducted, liquid in the corresponding first pipe flows, and when the single valve of the first multiport valve is not conducted, liquid in the corresponding first pipe does not flow. Each liquid supply device 212 may alternatively inject the liquid into the temperature regulating device 220 through corresponding at least one second pipe. Each second pipe is controlled by a single valve in the second multiport valve, so that when the single valve in the second multiport valve is conducted, the liquid in the corresponding second pipe flows, and when the single valve in the second multiport valve is not conducted, the liquid in the corresponding second pipe does not flow. Different first pipes corresponding to the inputs of different liquid supply devices 212 are independent of each other, and different second pipes corresponding to the outputs of the different liquid supply devices 212 are independent of each other. In addition, any two second pipes in the second pipes corresponding to the outputs of the different liquid supply devices 212 may be further connected through corresponding at least one third pipe and flowing of liquid in each third pipe is controlled by the third single valve in the second multiport valve. When the third single valve in the second multiport valve is conducted, liquid in the third pipe corresponding to the third single valve flows. When the third single valve in the second multiport valve is not conducted, the liquid in the third pipe corresponding to the third single valve is not conducted.

In this embodiment, the liquid dispensing device 210 may further include a liquid discharge valve 214 and a liquid discharge port 215. The liquid discharge valve 214 may be connected to the at least one liquid storage device 211 and may be connected to the at least one liquid storage device 211 through the first multiport valve or any single valve of the first multiport valve. The controller 213 may also control the first multiport valve connected to the input of the liquid supply device 212 not to be conducted and control the liquid discharge valve 214 to be conducted when the liquid in the liquid storage device 211 needs to be replaced, so that remaining liquid in the liquid storage device 211 can be discharged through the liquid discharge port 215.

It should be understood that the liquid discharge valve 214 in this embodiment may be manually conducted or to be not conducted. Therefore, when the temperature control apparatus 200 is maintained or the liquid stored in the liquid storage device 211 is replaced, a control manner of the controller 213 may be selected based on an actual situation. For example, the controller 213 may transmit a control instruction to the liquid discharge valve 214, to control the liquid discharge valve 214 to be conducted or not to be conducted, or a user manually operates the liquid discharge valve 214, to control the liquid discharge valve 214 to be conducted or not to be conducted. This is not limited herein.

It should be noted that, in this embodiment, how to configure or assemble the first multiport valve correspondingly connected to the input of each liquid supply device 212 and the second multiport valve correspondingly connected to the output of each liquid supply device 212 is not limited. In addition, on the basis that the pipe used to transport the liquid is not easily leaked, a material and a type of the pipe may not be limited. In addition, types or sizes of the plurality of liquid inlets, liquid outlets, liquid discharge ports, and the like that are involved in the liquid dispensing device 210 may be configured based on an actual use situation. This is not limited.

Optionally, the controller 213 may be separately connected to the liquid storage device 211, the liquid supply device 212, or a processing chip of the temperature control system, and configured to receive a corresponding signal or instruction information. The connection manner may be implemented in a wired communication manner, a wireless communication manner, or the like. This is not limited.

It should be noted that a manner of connecting the devices and the devices in the liquid dispensing device 210 is merely an implementation example. Therefore, in actual use, it is not limited to the foregoing connection manner, and the connection may alternatively be performed by another connection manner. This is not limited.

The temperature regulating device 220 is configured to connect the output of the second multiport valve, regulate a temperature of the liquid injected by each liquid supply device 212, and supply the temperature-regulated liquid to the at least one battery system. As shown in FIG. 2B, the temperature regulating device 220 may include a heating device 221, a cooling device 222, and a first controller 223.

In one embodiment, the output of each liquid supply device 212 in the liquid dispensing device 210 may deliver liquid to the temperature regulating device 220 through corresponding at least one second pipe.

The heating device 221 and the cooling device 222 are separately connected to the first controller 223, and the first controller 223 may be configured to control the heating device 221 and the cooling device 222 to operate according to the received instruction.\ When receiving a heating instruction, the first controller 223 controls the heating device 221 to operate and controls the cooling device 222 to not operate. The heating device 221 may be configured to heat liquid in the second pipe corresponding to the output of each liquid supply device 212, so that a temperature of the liquid is increased to a specified temperature. When receiving a cooling instruction, the first controller 223 controls the cooling device 222 to operate and controls the heating device 221 to not operate. The cooling device 222 may be configured to cool liquid in the second pipe corresponding to the output of each liquid supply device 212, so that a temperature of the liquid is reduced to a specified temperature.

It should be noted that an actual placement form of the heating device 221 and the cooling device 222 is not limited. Each device may be separately disposed in a surrounding pipe mode, or each device is located at a central position of the temperature regulating device, or the like.

In addition, a manner in which the heating device 221 and the cooling device 222 perform heating or cooling is not limited. For example, the heating device 221 may heat liquid in a pipe by generating hot air, and the cooling device 222 may cool the liquid in the pipe by generating cold air. For another example, the heating device 221 may alternatively heat the heating device 221 in a power-on mode, and further heat the liquid in the pipe. The cooling device 222 may alternatively cool the cooling device 222 in the power-on mode, and further cool the liquid in the pipe.

Figure 3A:
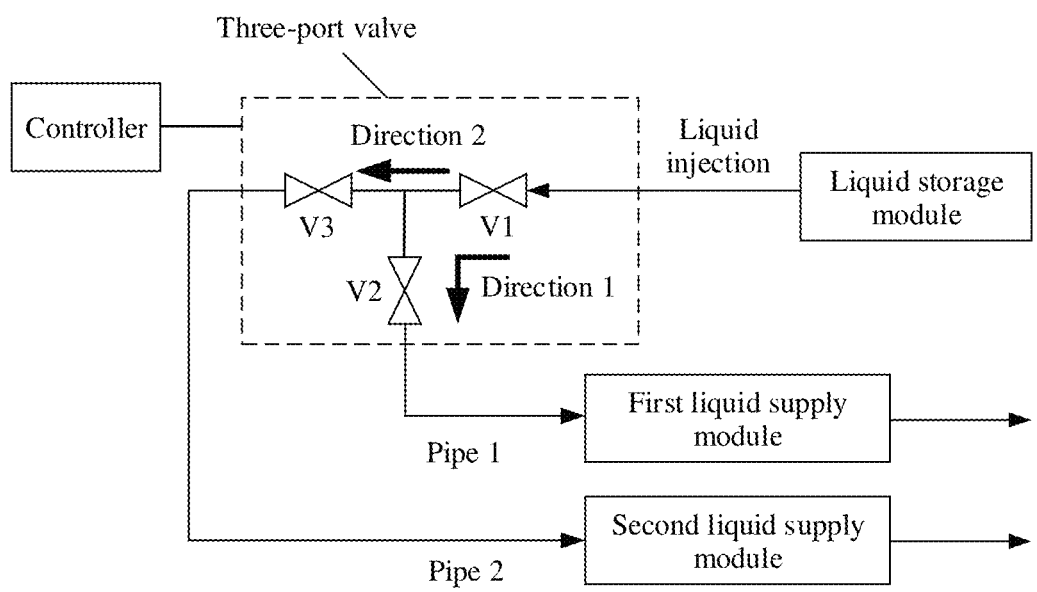
FIG. 3A(*a*), FIG. 3A(*b*), and FIG. 3A(*c*) each are is a schematic diagram of an operation and a structure of a three-port valve according to an embodiment.
Figure 3A:
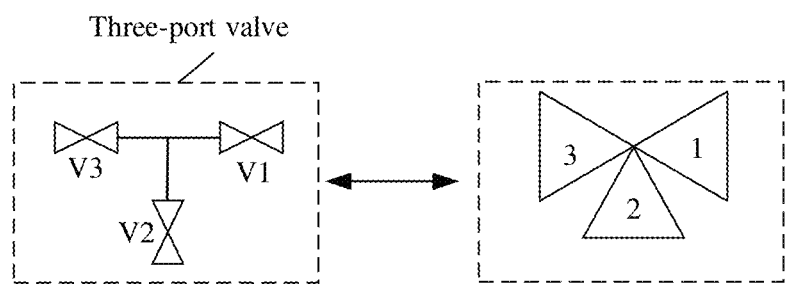
Figure 3B:
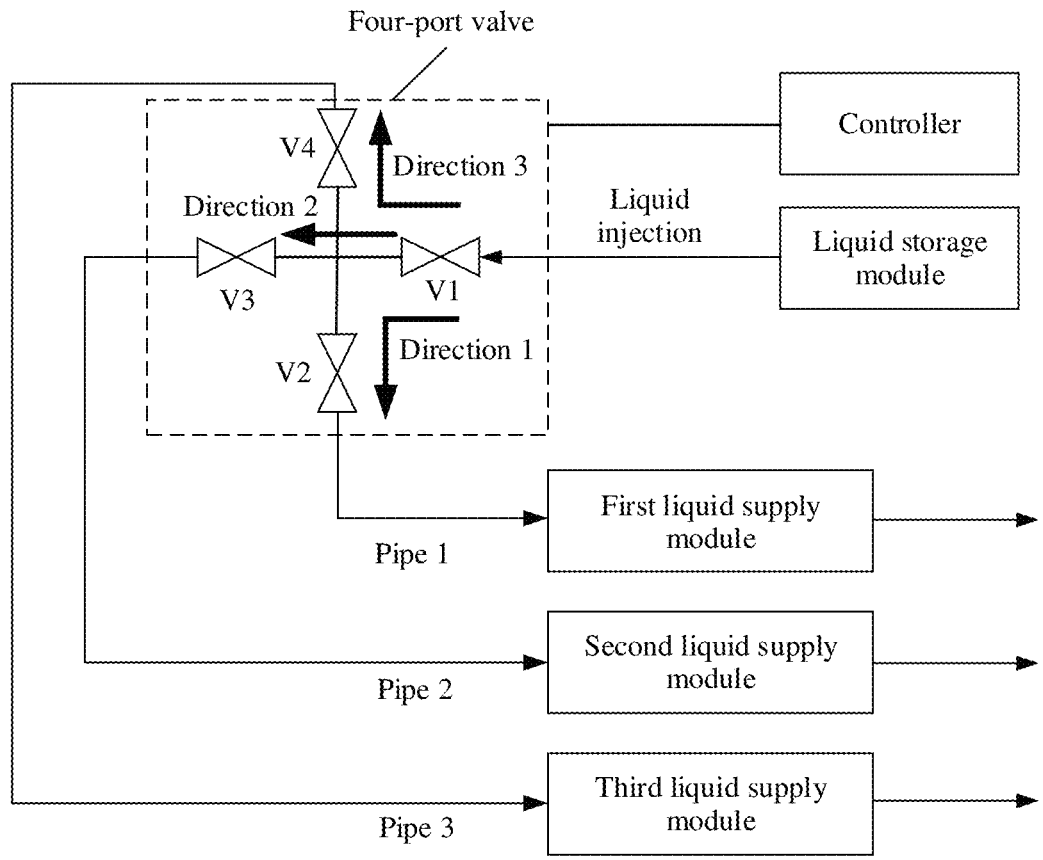
FIG. 3B(*a*), FIG. 3B(*b*), and FIG. 3B(*c*) each are a schematic diagram of an operation and a structure of a four-port valve according to an embodiment.
Figure 3B:
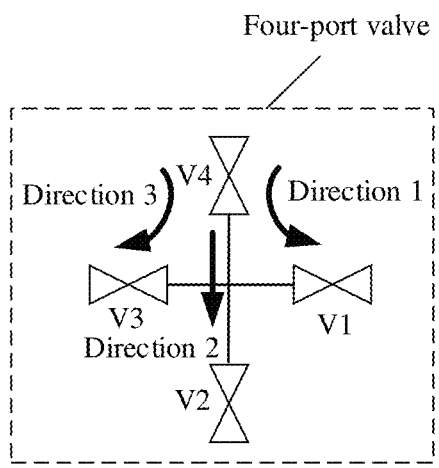
Figure 3B:
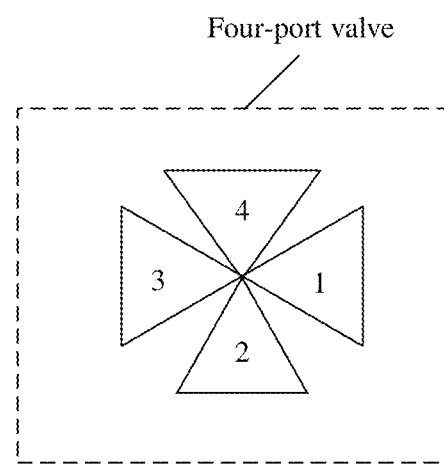

Refer to FIG. 3A(*a*), FIG. 3A(*b*), and FIG. 3A(*c*) and FIG. 3B(*a*), FIG. 3B(*b*), and FIG. 3B(*c*). The following describes in detail how the at least two liquid supply devices obtain the liquid injected by the at least one liquid storage device through a multiport valve.

It should be understood that if the first multiport valve corresponding to the inputs of the at least two liquid supply devices 212 may include a plurality of single valves, and the second multiport valve corresponding to the outputs of the at least two liquid supply devices 212 may also include a plurality of single valves. For example, a multiport valve includes three single valves, the multiport valve may be referred to as a three-port valve. If a multiport valve includes four single valves, the multiport valve may be referred to as a four-port valve. In addition, in actual production or use, a quantity of single valves included in the multiport valve may be set based on actual quantities of liquid storage devices and the liquid supply device. This is not limited. A multiport valve group is the same as the multiport valve, and details are not described.

For example, as shown in FIG. 3A(*a*), in a liquid dispensing device, two liquid supply devices (a first liquid supply device and a second liquid supply device) may obtain liquid supplied by the liquid storage device through a three-port valve. The three-port valve includes single valves V1, V2, and V3. The single valve V1 is a valve corresponding to a liquid inlet of the liquid storage device, a single valve V2 is a single valve correspondingly connected to an input of the first liquid supply device, and the single valve V3 is a single valve correspondingly connected to an input of the second liquid supply device. The controller in the liquid dispensing device may separately control the single valves V1, V2, and V3 to be conducted or not to be conducted.

In one embodiment, when both the first liquid supply device and the second liquid supply device can normally operate, the controller receives a control instruction, controls, according to the instruction, the single valve V1 in the three-port valve to be conducted, controls the single valve V2, correspondingly connected to the input of the first liquid supply device, to be conducted, and controls the single valve V3, correspondingly connected to the input of the second liquid supply device, to be conducted. In this case, the liquid stored in the liquid storage device may be injected into the first liquid supply device through a pipe 1 in a direction 1, and the liquid in the liquid storage device is injected into the second liquid supply device through a pipe 2 in a direction 2.

In another embodiment, when either of two liquid supply devices is faulty, the controller receives a new control instruction, controls, according to the control instruction, the single valve V1 in the three-port valve to be conducted, simultaneously controls a single valve, correspondingly connected to an input of the faulty liquid supply device, not to be conducted, and controls a single valve, correspondingly connected to an input of a liquid supply device that normally operates, to be conducted.

For example, when the first liquid supply device is faulty and the second liquid supply device is normal, the controller controls, according to the received control instruction, the single valve V1 to be conducted, simultaneously controls the single valve V2, correspondingly connected to the input of the first liquid supply device, not to be conducted, and controls the single valve V3, correspondingly connected to the input of the second liquid supply device, to be conducted, so that the liquid in the liquid storage device can be injected into the second liquid supply device through the pipe 2, but cannot be injected into the first liquid supply device through the pipe 1.

It should be noted that, in an actual product, in addition to the structure shown in FIG. 3A(b) the three-port valve may be alternatively disposed in the structure shown in FIG. 3A(c). A structure of the three-port valve is not limited.

For example, as shown in FIG. 3B(a), in the liquid dispensing device, when three liquid supply devices (in the figure, the first liquid supply device, the second liquid supply device, and a third liquid supply device are used as examples) obtain the liquid supplied by the liquid storage device through the four-port valve, the four-port valve includes single valves V1, V2, V3 and V4. The single valve V1 is a valve corresponding to a liquid injection port of the liquid storage device, the single valve V2 is a single valve correspondingly connected to the input of the first liquid supply device, the single valve V3 is a single valve correspondingly connected to the input of the second liquid supply device, and the single valve V4 is a single valve correspondingly connected to an input of the third liquid supply device. The controller in the liquid dispensing device may separately control the single valves V1, V2, V3, and V4 to be conducted or not to be conducted.

In one embodiment, when all devices in the liquid dispensing device normally operate, the controller receives a control instruction, and the controller controls, according to the control instruction, the single valve V1 in the four-port valve to be conducted, and simultaneously controls the single valve V2, correspondingly connected to the input of the first liquid supply device, to be conducted, the single valve V3, correspondingly connected to the input of the second liquid supply device, to be conducted, and the single valve V3, correspondingly connected to the input of the third liquid supply device, to be conducted. In this case, the liquid in the liquid storage device is injected into the first liquid supply device through the pipe 1 in the direction 1, the liquid in the liquid storage device is injected into the second liquid supply device through the pipe 2 in the direction 2, and the liquid in the liquid storage device is injected into the third liquid supply device through a pipe 3 in a direction 3.

In another embodiment, when any one of the three liquid supply devices is faulty, the controller receives a new control instruction, and controls, according to the control instruction, the single valve V1 in the four-port valve to be conducted, simultaneously controls a single valve, correspondingly connected to an input of the faulty liquid supply device, not to be conducted, and controls single valves, correspondingly connected to inputs of normal liquid supply devices, to be conducted. Reference may be made herein to the example in FIG. 3A(a), and details are not described herein again.

It should be noted that, in an actual product, in addition to the structure shown in FIG. 3B(b), the four-port valve may be disposed in the structure shown in FIG. 3B(c). Settings of the four-port valve are not limited.

The three-port valve and the four-port valve are examples to describe a process in which the liquid storage device injects the liquid into the at least two liquid supply devices. In actual use, there may be a plurality of liquid supply devices included in the liquid dispensing device. However, a quantity of multiport valves disposed is not limited to four-port valve. However, for principles of the multiport valve used to distribute liquid, refer to FIG. 3A(a), FIG. 3A(b), and FIG. 3A(c) and FIG. 3B(a), FIG. 3B(b), and FIG. 3B(c). Details are not described herein again.

Figure 4A:
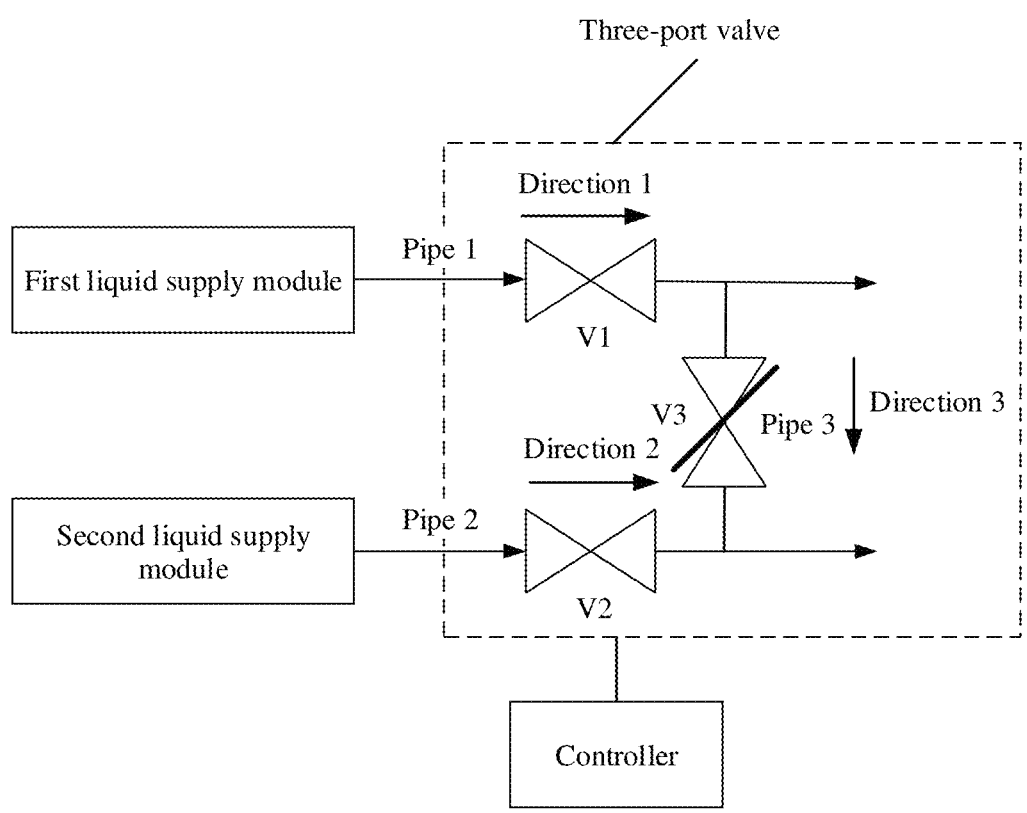
FIG. 4A is a schematic diagram of an operation of three-port valve when all liquid supply devices normally operate according to an embodiment.
Figure 4B:
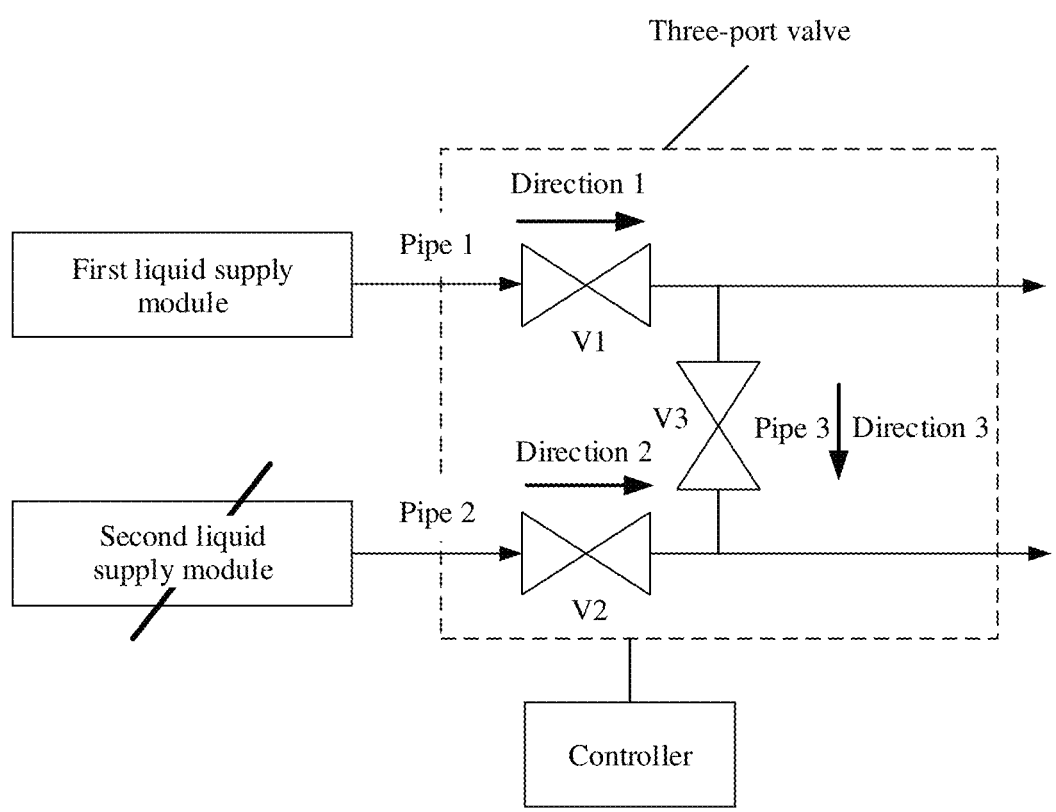
FIG. 4B is a schematic diagram of an operation of a three-port valve when a liquid supply device is faulty according to an embodiment.

Refer to FIG. 4A and FIG. 4B. How the at least two liquid supply devices inject liquid into the at least one battery system through a multiport valve or multiport valve group is described in detail below.

For example, as shown in FIG. 4A and FIG. 4B, in the liquid dispensing device, two liquid supply devices (a first liquid supply device and a second liquid supply device are used for illustration) inject the liquid into a corresponding battery system through a three-port valve, where the three-port valve includes a single valve V1, a single valve V2, and a single valve V3. The first liquid supply device is connected to the temperature regulating apparatus through the corresponding single valve V1, the second liquid supply device is connected to the temperature regulating apparatus through the corresponding single valve V2, and the single valve V3 is located between the single valve V1 and the single valve V2. The controller in the liquid dispensing device may separately control the single valves V1, V2, and V3 to be conducted or not to be conducted.

In an implementation, as shown in FIG. 4A, when both the first liquid supply device and the second liquid supply device can normally operate, the controller receives a first instruction, controls, according to the first instruction, the single valves V1 and V2 to be conducted, and controls the single valve V3 not to be conducted. The first liquid supply device delivers liquid to the temperature regulating apparatus through a pipe 1 in a direction 1, and the second liquid supply device delivers liquid to the temperature regulating apparatus through a pipe 2 in a direction 2. The liquid in either the first liquid supply device or the second liquid supply device cannot be transferred to each other through the single valve V3 (that is, a pipe 3 cannot be conducted).

In another implementation, as shown in FIG. 4B, when any one of the two liquid supply devices is faulty, the controller receives a second instruction, and controls, according to the second instruction, a single valve, corresponding to the faulty liquid supply device, not to be conducted, controls a single valve, corresponding to the normal liquid supply device, to be conducted, and also controls the single valve V3 to be conducted.

For example, when the first liquid supply device normally operates, and the second liquid supply device is faulty, the controller receives the second instruction, controls, according to the second instruction, the single valve V1, corresponding to the first liquid supply device, to be conducted, controls the single valve V2, corresponding to the second liquid supply device, not to be conducted, and controls the single valve V3 to be conducted. In this case, a part of liquid in the first liquid supply device may be injected into a corresponding battery system through the pipe 1 in the direction 1, and another part of liquid in the first liquid supply device may be injected into a battery system corresponding to the second liquid supply device through the pipe 3 in the direction 3.

The single valves V1 and V2 also have a function of preventing liquid backflow when the single valves V1 and V2 are conducted.

In this manner, when the second liquid supply device is faulty, a part of liquid in the first liquid supply device may still be injected into the battery system corresponding to the second liquid supply device, so that both the battery system corresponding to the first liquid supply device and the battery system corresponding to the second liquid supply device can store liquid at a temperature, to ensure that the battery system corresponding to the first liquid supply device can normally operate, and may also ensure that the battery system corresponding to the second liquid supply device can operate.

Figure 5A:
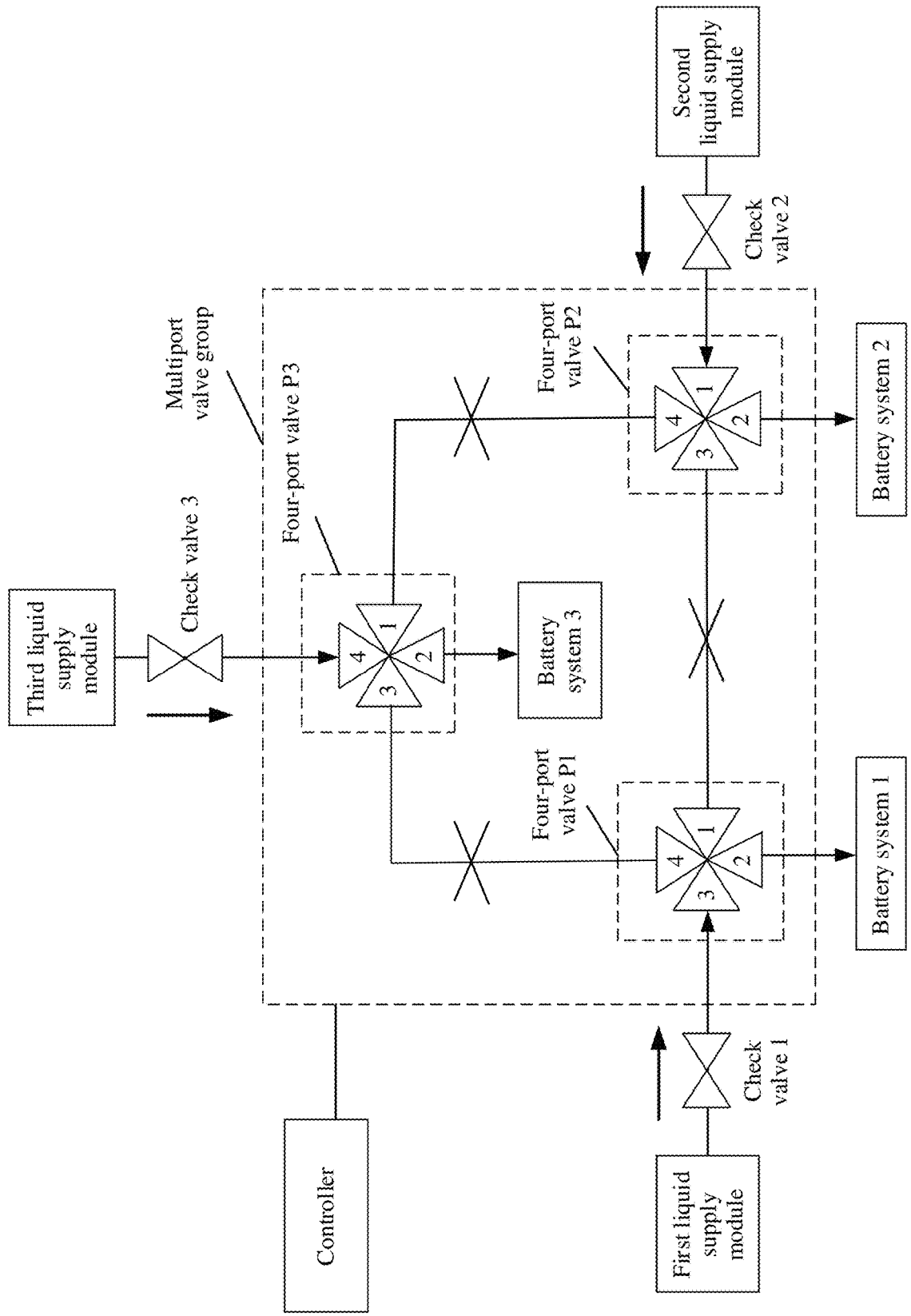
FIG. 5A is a schematic diagram of an operation of a four-port valve group when all liquid supply devices normally operate according to an embodiment.
Figure 5B:
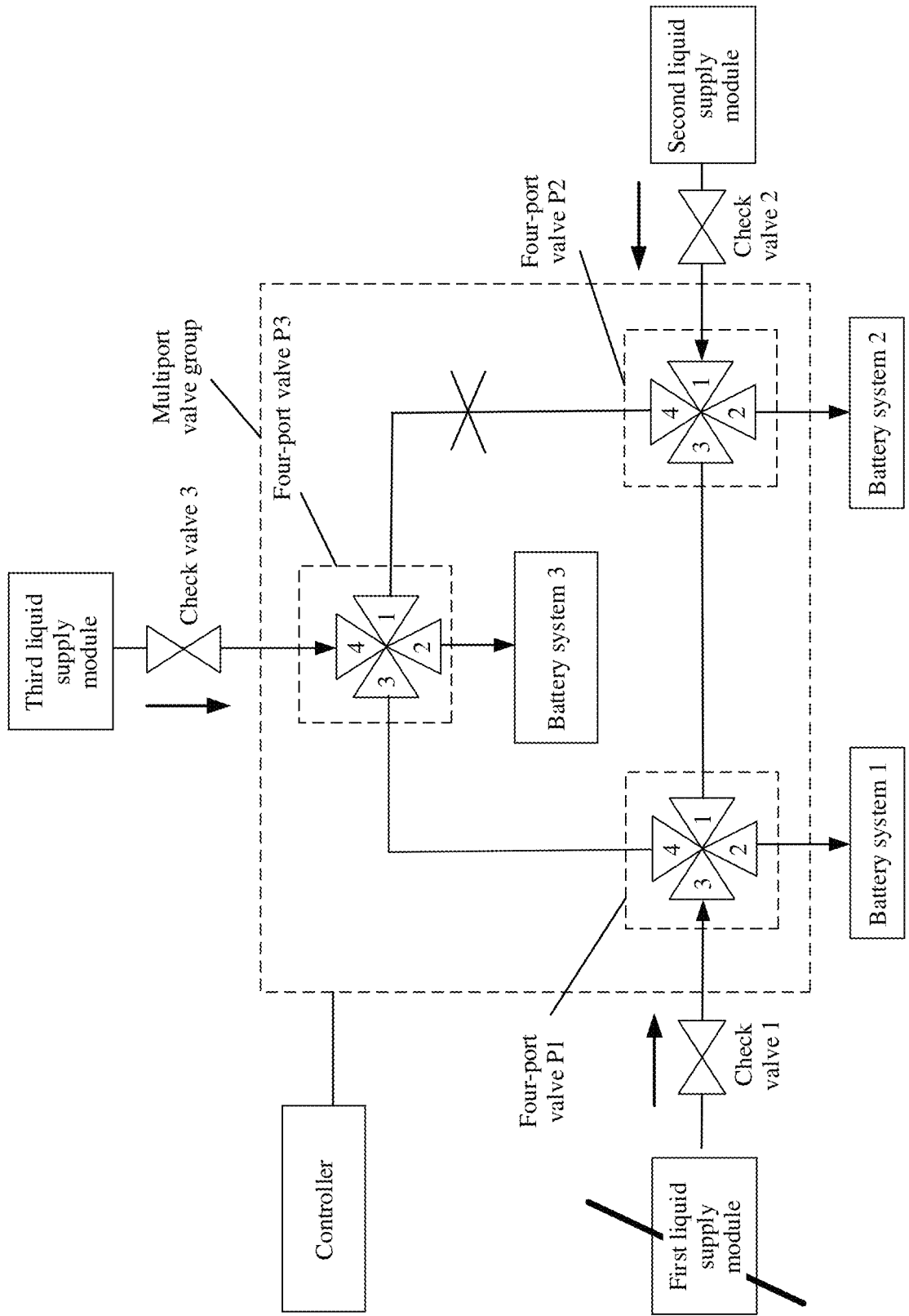
FIG. 5B is a schematic diagram of operation of a four-port valve group when a liquid supply device is faulty according to an embodiment.

As shown in FIG. 5A and FIG. 5B, in the liquid dispensing device, three liquid supply devices may further inject liquid into a corresponding battery system through a multiport valve group, where the multiport valve group includes a four-port valve P1, a four-port valve P2, and a four-port valve P3. The first liquid supply device corresponds to the four-port valve P1, the second liquid supply device corresponds to the four-port valve P2, the third liquid supply device corresponds to the four-port valve P3, and any two of the three four-port valves P1, P2, and P3 are connected to each other.

It should be noted that a structure and conduction function of any one of the four-port valves P1, P2 and P3 are the same as those of the four-port valve in FIG. 3B(a) or FIG. 3B(b). For details, refer to the structure shown in FIG. 3B(a) or FIG. 3B(b). Details are not described herein again.

In one implementation, as shown in FIG. 5A, when all three liquid supply devices normally operate, the controller receives a third instruction, controls, according to the third instruction, valves 1 and 3 in the four-port valve P1 and valves 1 and 3 in the four-port valve P2 not to be conducted, so that liquid conduction between the four-port valves P1 and P2 cannot be implemented through a pipe, controls valves 1 and 4 in the four-port valve P2 and valves 1 and 4 in the four-port valve P3 not to be conducted, so that liquid conduction between the four-port valves P2 and P3 cannot be implemented through a pipe, and controls valves 3 and 4 in the four-port valve P3 and valves 3 and 4 in the four-port valve P1 not to be conducted, so that liquid conduction between the four-port valves P2 and P3 cannot be implemented through a pipe.

In this case, the liquid of the first liquid supply device is injected only into a corresponding battery system 1 through a corresponding pipe and cannot be injected into a battery system 2 and a battery system 3. The liquid of the second liquid supply device is injected only into the corresponding battery system 2 through a corresponding pipe and cannot be injected into the battery system 1 and the battery system 3. The liquid of the third liquid supply device is injected only into the corresponding battery system 3 through a corresponding pipe and cannot be injected into the battery system 1 and the battery system 2.

It should be noted that a check valve 1, a check valve 2, and a check valve 3 are respectively disposed between the first liquid supply device 1, the second liquid supply device 2, and the third liquid supply device 3 and the corresponding multiport valves P1, P2, and P3. The check valve 1, the check valve 2, and the check valve 3 are used to prevent liquid from flowing back into the liquid supply device.

In another implementation, as shown in FIG. 5B, when any one of the three liquid supply devices is faulty, the controller receives a fourth instruction, controls, according to the fourth instruction, a four-port valve, corresponding to the faulty liquid supply device and multiport valves corresponding to the other liquid supply devices that normally operate to be conducted, and controls the multiport valves, corresponding to the other liquid supply devices that normally operate, not be able to be conducted with each other.

For example, when the first liquid supply device is faulty, and all other liquid supply devices normally operate, the controller receives the fourth instruction, controls, according to the fourth instruction, any two valves of the valves 1, 2, 3, and 4, in the four-port valve P1 corresponding to the first liquid supply device, to be conducted, controls the valves 1 and 2, in the four-port valve P2 corresponding to the second liquid supply device, to be conducted, the valves 1 and 3, in the four-port valve P2 corresponding to the second liquid supply device, to be conducted, and the valves 1 and 4 in the four-port valve P2 not to be conducted, and controls the valves 3 and 4, in the four-port valve P3 corresponding to the third liquid supply device, to be conducted, valves 2 and 4, in the four-port valve P3 corresponding to the third liquid supply device, to be conducted, and the valves 1 and 4 in the four-port valve P3 not to be conducted. In this way, the second liquid supply device may inject the liquid into the corresponding battery system 2 and may inject the liquid into the battery system 1, and the third liquid supply device may inject the liquid into the corresponding battery system 3 and may inject the liquid into the battery system 1.

It should be noted that, in the FIG. 5A and FIG. 5B, the check valve 1, the check valve 2, and the check valve are respectively disposed between the first liquid supply device 1, the second liquid supply device 2, and the third liquid supply device 3 and the corresponding multiport valves P1, P2, and P3. The check valve 1, the check valve 2, and the check valve 3 are used to prevent the liquid from flowing back into the liquid supply device.

It should be understood that, in this embodiment, before the first liquid supply device 1, the second liquid supply device 2, and the third liquid supply device 3 respectively inject the liquid into the battery system 1, the battery system 2, and the battery system 3, the temperature regulating device further needs to regulate a temperature of the liquid. Herein, in order to clearly describe transfer forms of the multiport valve and the multiport valve group, it is marked in FIG. 3A(a), FIG. 3A(b), and FIG. 3A(c) and FIG. 3B(a), FIG. 3B(b), and FIG. 3B(c), FIG. 4A and FIG. 4B, and FIG. 5A and FIG. 5B.

Figure 5C:
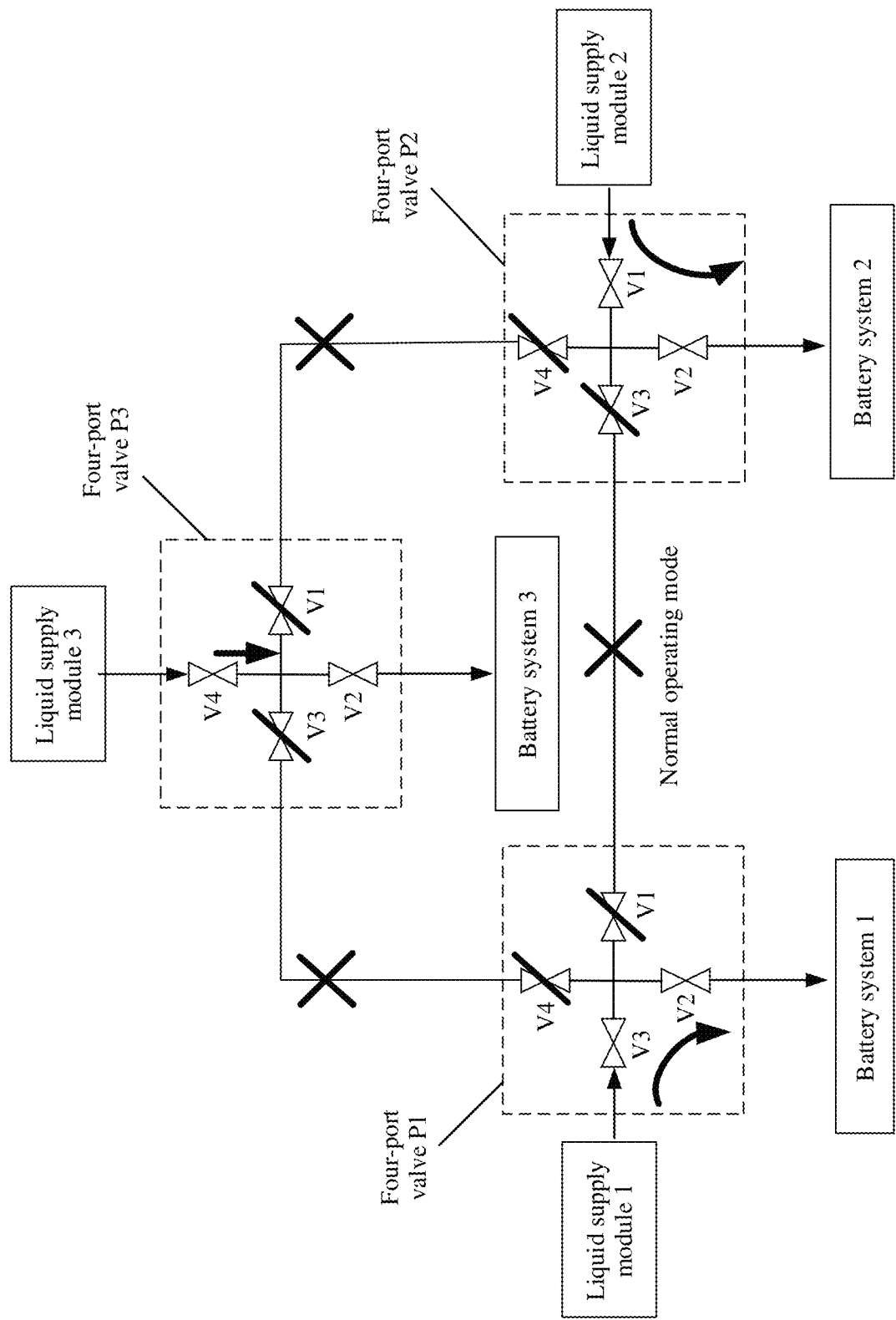
FIG. 5C is a schematic diagram of an operation of a four-port valve group when liquid supply devices normally operate according to an embodiment.

In addition, as shown in FIG. 5A, when all the three liquid supply devices in the liquid dispensing device normally operate, how to distribute the liquid in the liquid supplying device to the corresponding battery system through the four-port valve group, and how to set and operate the four-port valve group in FIG. 5A can refer to FIG. 5C. The controller controls the single valves V2 and V3 in the four-port valve P1 to be conducted, and the single valves V1 and V4 in the four-port valve P1 not to be conducted. In this case, the liquid supply device 1 may inject the liquid into the corresponding battery system 1 through a pipe connected by the single valves V2 and V3 of the valve P1. The controller controls the single valves V1 and V2 in the four-port valve P2 to be conducted, and the single valves V3 and V4 in the four-port valve P2 not to be conducted. The liquid supply device 2 may inject the liquid into the corresponding battery system 2 through a pipe connected by the single valves V1 and V2 in the valve P2. The controller controls the single valves V2 and V4 in the four-port valve P3 to be conducted, and the single valves V1 and V3 in the four-port valve P3 not to be conducted. The liquid supply device 3 may inject the liquid into the corresponding battery system 3 through a pipe connected by the single valves V2 and V4 in the valve P3.

Figure 5D:
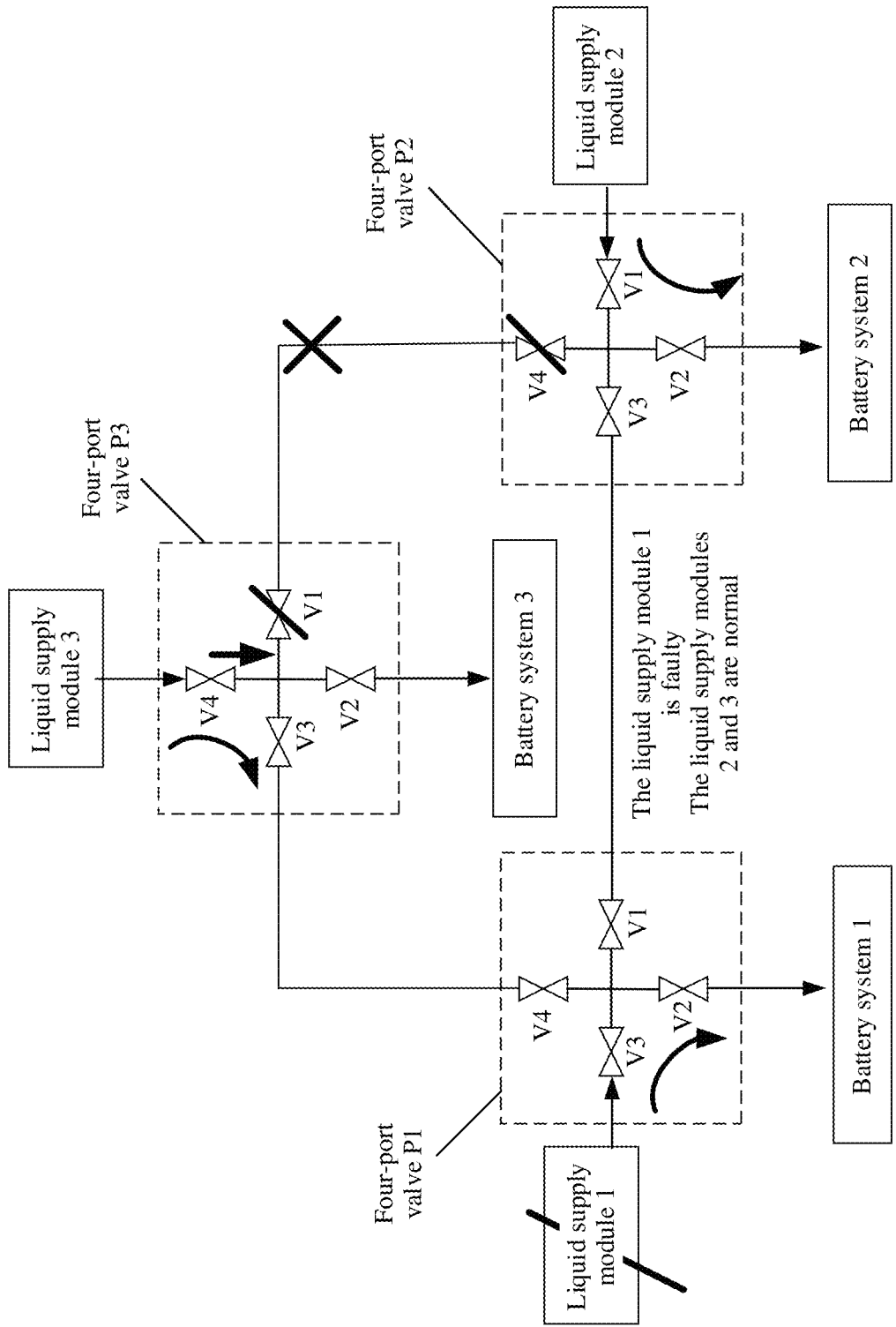
FIG. 5D is a schematic diagram of an operation of a four-port valve group when a liquid supply device is faulty according to an embodiment.

As shown in FIG. 5B, when the liquid supply device 1 of the three liquid supply devices in the liquid dispensing device is faulty and the liquid supply devices 2 and 3 normally operate, how the liquid in the liquid supply device is dispensed to the corresponding battery system through the four-port valve group, and how to set and operate the four-port valve group in FIG. 5B can refer to FIG. 5D. The controller controls the single valves V1, V2, V3, and V4 in the four-port valve P1 to be conducted. The controller controls the single valves V1, V2 and V3 in the four-port valve P2 to be conducted, and the single valve V4 in the four-port valve P2 not to be conducted. In this case, the liquid supply device 2 may inject the liquid into the corresponding battery system 2 through a pipe connected by the single valves V1 and V2 of the four-port valve P2, and the liquid supply device 2 may further inject the liquid into the battery system 1 through the single valves V1 and V3 of the four-port valve P2, and the single valves V1 and V2 of the four-port valve P1.

The controller controls the single valves V2, V3, and V4 in the four-port valve P3 to be conducted, and the single valve V1 in the four-port valve P3 not to be conducted. The liquid supply device 3 may inject the liquid into the corresponding battery system 3 through a pipe connected by the single valves V2 and V4 in the valve P3. At the same time, the liquid supply device 3 may also inject the liquid into the battery system 1 through the single valves V3 and V4 in the four-port valve P3 and the single valves V3 and V4 in the four-port valve.

In conclusion, the temperature control apparatus can supply the temperature-regulated liquid to each battery system through each liquid supply device. When one of the liquid supply devices is faulty, the temperature-regulated liquid can continue to be supplied to the battery system through another liquid supply device that normally operates, or the temperature-regulated liquid is continuously supplied to the battery system corresponding to the faulty liquid supply device, so that the temperature control process of each battery system is more reliable.

The following describes in detail a temperature control system and apparatus provided in the embodiments with reference to the embodiments.

Figure 6:
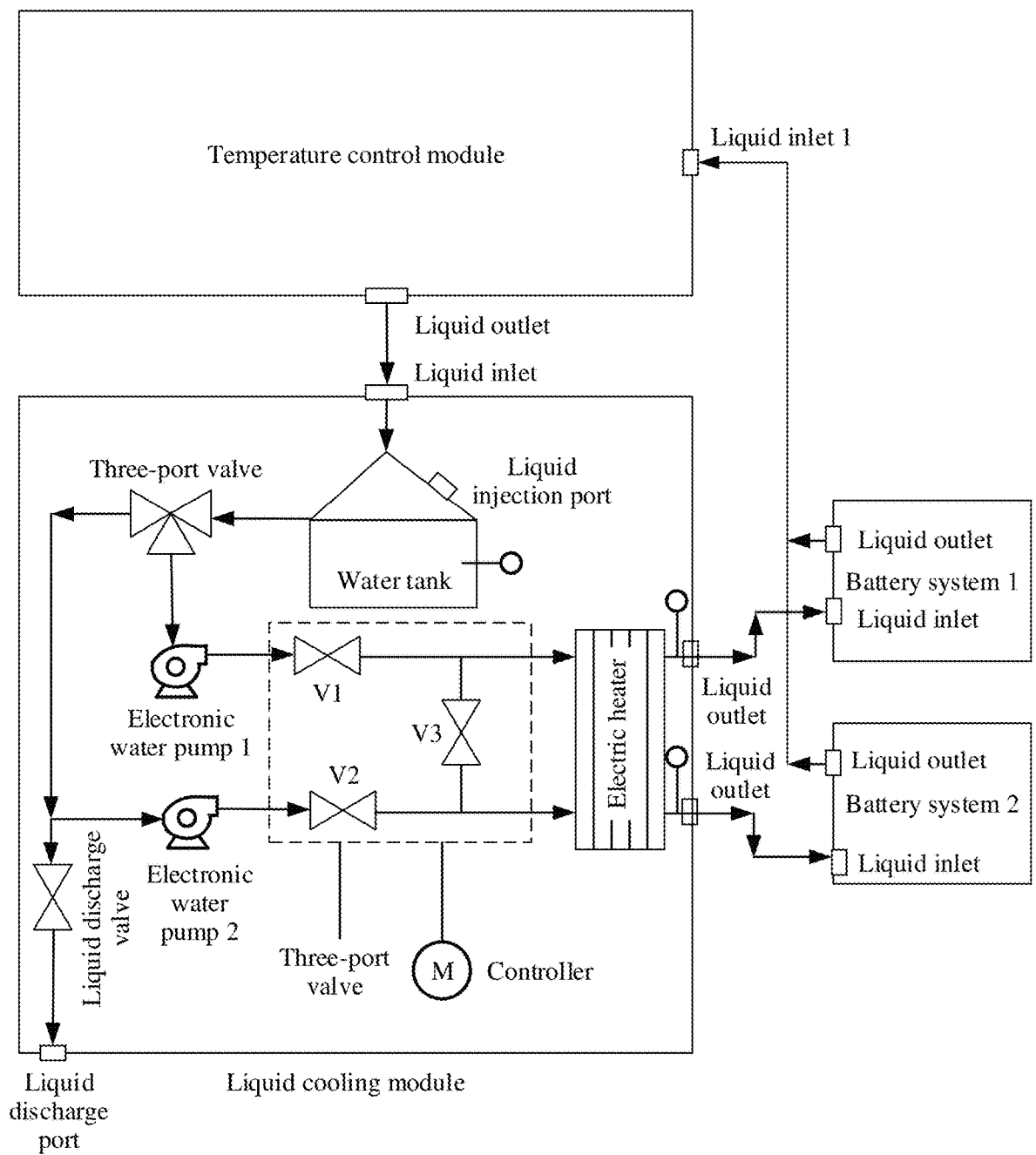
FIG. 6 is a schematic diagram of an operation of a embodiment of a temperature control system according to an embodiment.

As shown in FIG. 6, the temperature control system includes a temperature control device, a liquid cooling device, an electric heater, a battery system 1, and a battery system 2. The liquid cooling device is equivalent to the liquid dispensing device in the foregoing, and the temperature control device and the electric heater are equivalent to the temperature regulating device in the foregoing. One water tank in the liquid cooling device is equivalent to the foregoing one liquid storage device, and an electronic water pump 1 and an electronic water pump 2 in the liquid cooling device are equivalent to the foregoing two liquid supply devices. In this embodiment, water is used as an example of transferred liquid.

The following describes the connection and operation of the temperature control system in detail.

Water used in the battery system 1 and the battery system 2 separately flows out of a liquid outlet into at least one pipe and flows into the temperature control device from a liquid inlet of the temperature control device through the at least one pipe. The temperature control device may cool high-temperature water from the battery system 1 and the battery system 2 and may flow the cooled water from a liquid outlet of the temperature control device into the at least one pipe and flow the cooled water from a liquid inlet of the liquid cooling device into the water tank through the at least one pipe. The water tank stores the water input by the temperature control device, and an external source device may inject water into the water tank through a liquid injection port of the water tank.

An output port of the water tank is connected to a three-port valve, and inputs of the electronic water pump 1 and the electronic water pump 2 respectively correspond to a single valve in the three-port valve. When the temperature control apparatus is in an operating state of supplying liquid to the battery system 1 and the battery system 2, the three-port valve may be in a normally open state, and a liquid discharge valve may not be manually conducted, so that the liquid in the water tank may be injected into the electronic water pump 1 through a pipe, and may be injected into the electronic water pump 2 through another pipe. When the temperature control apparatus is in a non-operating state or in a maintenance state, or when water in the water tank needs to be discharged, the liquid discharge valve may be manually conducted, and the water in the water tank may be discharged outward from a liquid discharge port of the liquid cooling device through a pipe.

It should be understood that the three-port valve and the liquid discharge valve may alternatively be disposed to separately connect to a controller, and the controller controls the three-port valve and the liquid discharge valve to be conducted or not to be conducted. Details are not described herein.

Output ports of the electronic water pump 1 and the electronic water pump 2 are connected to another three-port valve 2, and the three-port valve 2 includes a single valve V1, a single valve V2, and a single valve V3. The single valve V1 is connected to the output of the electronic water pump 1, the single valve V2 is connected to the output of the electronic water pump 2, and the single valve V3 is located between an output of the single valve V1 correspondingly connected to the electronic water pump 1 and an output of the single valve V2 correspondingly connected to the electronic water pump 2.

When both the electronic water pump 1 and the electronic water pump 2 normally operate, the controller may control the single valve V1 and the single valve V2 to be conducted, and the single valve V3 not to be conducted. The water of the electronic water pump 1 may be properly heated by the electronic heater and flow into the corresponding battery system 1 through a corresponding pipe, and the water of the electronic water pump 2 may be properly heated by the electronic heater and flow into the corresponding battery system 2 through a corresponding pipe and.

When the electronic water pump 1 is faulty, the controller can control the single valve V3 to be conducted, and a part of water in the electronic water pump 2 may be properly heated by the electronic heater and flow into the corresponding battery system 2 through a corresponding pipe. In addition, the water in the electronic water pump 2 may be properly heated by the electronic heater and flow into the corresponding battery system 1 through a pipe conducted by the single valve V3. Therefore, the battery system 1 can still be temperature regulated to maintain normal operation.

When the electronic water pump 2 is faulty, the controller can control the single valve V3 to be conducted, and a part of the water of the electronic water pump 1 may be properly heated by the electronic heater and flow into the corresponding battery system 1 through a corresponding pipe. In addition, the water in the electronic water pump 1 may be properly heated by the electronic heater and flow into the corresponding battery system 2 through a pipe conducted by the single valve V3. Therefore, the battery system 2 can still be temperature regulated to maintain normal operation.

It should be understood that the water in the electronic water pump 1 may flow into a corresponding storage device in the electric heater through a corresponding pipe, and after being properly heated in the storage device, the water is output from a liquid outlet of the storage device to a corresponding pipe and injected into the battery system 1 through a liquid inlet of the battery system 1. The water in the electronic water pump 2 may flow into another corresponding storage device in the electric heater through a corresponding pipe, and after being properly heated in the storage device, the water is output from a liquid outlet of the storage device to a corresponding pipe and injected into the battery system 2 through a liquid inlet of the battery system 2.

The battery system 1 discharges used water from a liquid outlet to a corresponding pipe and injects the water from the liquid inlet of the temperature control device into the temperature control device through the pipe, and further cools the water in the temperature control device. Similarly, the battery system 2 discharges used water from a liquid outlet to a corresponding pipe and injects the water from the liquid inlet of the temperature control device into the temperature control device through the pipe, and further cools the water in the temperature control device. In this way, the water can be reused and resource waste can be avoided.

It should be understood that in embodiments, division into devices is an example, and is merely logical function division. During actual implementation, there may be another division manner. In addition, function devices in embodiments may be integrated into one processor, or each of the devices may exist alone physically, or two or more devices may be integrated into one device. The integrated device may be implemented in a form of hardware or may be implemented in a form of a software functional device.

The foregoing descriptions are merely embodiments, but are not intended to limit the protection scope. Any modification, equivalent replacement, and improvement shall fall within the scope of the embodiments.

What is claimed is:

1. A temperature control apparatus, comprising:
    a temperature regulating device;
    a liquid dispensing device that comprises:
        at least one liquid storage device configured to store liquid,
        at least two liquid supply devices, wherein an input of each liquid supply device is connected to the at least one liquid storage device through a first multiport valve to obtain cooling liquid, and an output of each liquid supply device is connected to the temperature regulating device through a second multiport valve; and
    a controller connected to the first multiport valve and the second multiport valve and configured to:
        control the first multiport valve and the second multiport valve to be conducted or not to be conducted, wherein each liquid supply device is configured to output the cooling liquid from the at least one liquid storage device to the temperature regulating device when the corresponding first multiport valve and the corresponding second multiport valve are both conducted; and the temperature regulating device is configured to connect an output of the second multiport valve, regulate a temperature of liquid injected by each liquid storage device, and supply the temperature-regulated liquid to at least one battery system.

2. The temperature control apparatus according to claim 1, wherein when two adjacent liquid supply devices normally operate, the controller is further configured to:
    control a first single valve and a second single valve that are in the second multiport valve to be conducted, and
    control a third single valve in the second multiport valve not to be conducted, so that liquid output by each liquid supply device is separately injected into a corresponding battery system through the temperature regulating device; and the first single valve is configured to connect an output of one of the two adjacent liquid supply devices to the temperature regulating device, the second single valve is configured to connect an output of the other one of the two adjacent liquid supply devices to the temperature regulating device, and the third single valve is configured to connect the outputs of the two adjacent liquid supply devices.

3. The temperature control apparatus according to claim 2, wherein the controller is further configured to:
    when the two adjacent liquid supply devices normally operate, control the first single valve and the second single valve to be conducted, and receive a first instruction before controlling the third single valve not to be conducted, wherein the first instruction is used to instruct the controller to control the first single valve and the second single valve, that are in the second multiport valve connected to the controller, to be conducted, and
    control the third single valve in the second multiport valve connected to the controller not to be conducted.

4. The temperature control apparatus according to claim 1, wherein when either of two adjacent liquid supply devices is faulty, the controller is further configured to:
    control a first single valve and a second single valve, that are in the second multiport valve to be conducted, and
    control a third single valve in the second multiport valve to be conducted, so that liquid output by the liquid supply device that normally operates is injected into a corresponding battery system through the temperature regulating device, and injected into a battery system corresponding to the faulty liquid supply device through the temperature regulating device; and the first single valve is configured to connect an output of one of the two adjacent liquid supply devices to the temperature regulating device, the second single valve is configured to connect an output of the other one of the two adjacent liquid supply devices to the temperature regulating device, and the third single valve is configured to connect the outputs of the two adjacent liquid supply devices.

5. The temperature control apparatus according to claim 4, wherein the controller is further configured to:
    receive a second instruction before controlling the first single valve and the second single valve that are in the second multiport valve to be conducted, and control the third single valve in the second multiport valve to be conducted, wherein the second instruction is used to instruct the controller to control the first single valve, the second single valve, and the third single valve that are in the second multiport valve connected to the controller to be conducted.

6. The temperature control apparatus according to claim 1, wherein when the at least one liquid storage device normally operates, the controller is further configured to:
control the first multiport valve to be conducted, so that the at least one liquid storage device separately injects liquid into the at least two liquid supply devices.

7. The temperature control apparatus according to claim 6, wherein the controller is further configured to:
when the at least one liquid storage device normally operates, receive a third instruction before controlling the first multiport valve to be conducted, wherein the third instruction is used to instruct the controller to control the first multiport valve to be conducted.

8. The temperature control apparatus according to claim 1, wherein when any one of the at least one liquid storage device is faulty, the controller is further configured to:
control a single valve that is in the first multiport valve and that corresponds to an output of the faulty liquid storage device not to be conducted, and
control a single valve that is in the first multiport valve and that corresponds an output of a liquid storage device that normally operates to be conducted, so that the liquid storage device that normally operates separately injects liquid into the at least two liquid supply devices.

9. The temperature control apparatus according to claim 8, wherein the controller is further configured to:
when the any one of the at least one liquid storage device is faulty, receive a fourth instruction before controlling the single valve that is in the first multiport valve and that corresponds to the output of the faulty liquid storage device not to be conducted, and controlling the single valve that is in the first multiport valve and that corresponds the output of the liquid storage device that normally operates to be conducted, wherein the fourth instruction is used to instruct the controller to control the single valve that is in the first multiport valve and that corresponds to the output of the faulty liquid storage device not to be conducted, and
control the single valve that is in the first multiport valve and that corresponds to the liquid storage device that normally operates to be conducted.

10. The temperature control apparatus according to claim 1, wherein the liquid dispensing device further comprises a liquid discharge port and a liquid discharge valve; the liquid discharge valve is configured to connect the output of the at least one liquid storage device; and the controller is further connected to the liquid discharge valve, and the controller is further configured to:
when the liquid in the liquid storage device needs to be replaced, control the first multiport valve connected to the liquid supply device not to be conducted, and control the liquid discharge valve to be conducted, so that remaining liquid in the liquid storage device is discharged through the liquid discharge port.

11. The temperature control apparatus according to claim 1, wherein the at least one liquid storage device is further configured to be connected to the at least one battery system, and the at least one liquid storage device is further configured to store liquid discharged by the at least one battery system when the at least one battery system is used.

12. A temperature control system, comprising
a temperature control apparatus; and
at least one battery system, wherein the temperature control apparatus is configured to inject liquid into the at least one battery system to implement temperature regulation for the at least one battery system, wherein the temperature control apparatus further comprises:
a temperature regulating device;
a liquid dispensing device that
comprises;
at least one liquid storage device configured to store liquid,
at least two liquid supply devices, wherein an input of each liquid supply device is connected to the at least one liquid storage device through a first multiport valve to obtain cooling liquid, and an output of each liquid supply device is connected to the temperature regulating device through a second multiport valve and
a controller that is connected to the first multiport valve and the second multiport valve, and is configured to control the first multiport valve and the second multiport valve to be conducted or not to be conducted, wherein each liquid supply device is configured to output the cooling liquid from the at least one liquid storage device to the temperature regulating device when the corresponding first multiport valve and the corresponding second multiport valve are both conducted; and the temperature regulating device is configured to connect an output of the second multiport valve, regulate a temperature of liquid injected by each liquid storage device, and supply the temperature-regulated liquid to at least one battery system.

13. The temperature control system according to claim 12, wherein when two adjacent liquid supply devices normally operate, the controller controls a first single valve and a second single valve, that are in the second multiport valve, to be conducted, and controls a third single valve in the second multiport valve not to be conducted, so that liquid output by each liquid supply device is separately injected into a corresponding battery system through the temperature regulating device.

14. The temperature control system according to claim 13, wherein the first single valve is configured to connect an output of one of the two adjacent liquid supply devices to the temperature regulating device, the second single valve is configured to connect an output of the other one of the two adjacent liquid supply devices to the temperature regulating device, and the third single valve is configured to connect the outputs of the two adjacent liquid supply devices.

15. The temperature control system according to claim 14, wherein the controller is further configured to:
when the two adjacent liquid supply devices normally operate, control the first single valve and the second single valve to be conducted, and receive a first instruction before controlling the third single valve not to be conducted, wherein the first instruction is used to instruct the controller to control the first single valve and the second single valve, that are in the second multiport valve connected to the controller, to be conducted and
control the third single valve in the second multiport valve connected to the controller not to be conducted.

16. The temperature control system according to claim 12, wherein when either of two adjacent liquid supply devices is faulty, the controller is further configured to:

control a first single valve and a second single valve, that are in the second multiport valve to be conducted, and control a third single valve in the second multiport valve to be conducted, so that liquid output by the liquid supply device that normally operates is injected into a corresponding battery system through the temperature regulating device, and injected into a battery system corresponding to the faulty liquid supply device through the temperature regulating device.

17. The temperature control system according to claim 16, wherein the first single valve is configured to connect an output of one of the two adjacent liquid supply devices to the temperature regulating device, the second single valve is configured to connect an output of the other one of the two adjacent liquid supply devices to the temperature regulating device, and the third single valve is configured to connect the outputs of the two adjacent liquid supply devices.

18. The temperature control system according to claim 17, wherein the controller is further configured to:
receive a second instruction before controlling the first single valve and the second single valve that are in the second multiport valve, to be conducted and controlling the third single valve in the second multiport valve to be conducted, wherein the second instruction is used to instruct the controller to
control the first single valve, the second single valve, and the third single valve that are in the second multiport valve connected to the controller to be conducted.

19. The temperature control system according to claim 12, wherein when the at least one liquid storage device normally operates, the controller is further configured to:
control the first multiport valve to be conducted, so that the at least one liquid storage device separately injects liquid into the at least two liquid supply devices.

* * * * *

UNITED STATES PATENT AND TRADEMARK OFFICE
CERTIFICATE OF CORRECTION

PATENT NO. : 12,272,808 B2
APPLICATION NO. : 17/729168
DATED : April 8, 2025
INVENTOR(S) : Hao Meng et al.

Page 1 of 1

It is certified that error appears in the above-identified patent and that said Letters Patent is hereby corrected as shown below:

In the Claims

Column 22, Claim 12, Line 10, please change from "comprises;" to "comprises:".

Signed and Sealed this
Third Day of June, 2025

Coke Morgan Stewart
*Acting Director of the United States Patent and Trademark Office*